(12) United States Patent
Liu

(10) Patent No.: US 10,225,519 B2
(45) Date of Patent: *Mar. 5, 2019

(54) USING AN AVATAR IN A VIDEOCONFERENCING SYSTEM

(71) Applicant: Google LLC, Mountain View, CA (US)

(72) Inventor: Eric H C Liu, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/663,399

(22) Filed: Jul. 28, 2017

(65) Prior Publication Data

US 2017/0332046 A1  Nov. 16, 2017

Related U.S. Application Data

(63) Continuation of application No. 15/224,157, filed on Jul. 29, 2016, now Pat. No. 9,723,265, which is a continuation of application No. 14/884,607, filed on Oct. 15, 2015, now Pat. No. 9,432,626, which is a continuation of application No. 13/766,485, filed on Feb. 13, 2013, now Pat. No. 9,191,619.

(60) Provisional application No. 61/678,535, filed on Aug. 1, 2012.

(51) Int. Cl.
| H04N 7/14 | (2006.01) |
| H04N 7/15 | (2006.01) |
| G06F 3/01 | (2006.01) |
| G06F 3/16 | (2006.01) |
| G06K 9/00 | (2006.01) |

(52) U.S. Cl.
CPC ............ *H04N 7/157* (2013.01); *G06F 3/017* (2013.01); *G06F 3/167* (2013.01); *G06K 9/00268* (2013.01); *H04N 7/147* (2013.01); *H04N 7/155* (2013.01)

(58) Field of Classification Search
USPC .................... 348/14.01, 14.03, 14.07, 14.08
See application file for complete search history.

(56) References Cited

U.S. PATENT DOCUMENTS

| 6,462,767 | B1 | 10/2002 | Obata et al. |
| 9,191,619 | B2 * | 11/2015 | Liu .................. H04N 7/157 |
| 9,432,626 | B2 | 8/2016 | Liu |
| 9,723,265 | B2 * | 8/2017 | Liu .................. H04N 7/157 |

(Continued)

FOREIGN PATENT DOCUMENTS

| KR | 10-2011-0025721 | 9/2006 |
| KR | 10-2011-0025718 | 3/2011 |
| KR | 10-2012-0018479 | 3/2012 |

OTHER PUBLICATIONS

International Preliminary Report on Patentability and Written Opinion in the International Searching Authority dated Jun. 25, 2013 in International Patent No. PCT/US2013/047494.
International Search Report and Written Opinion dated Oct. 21, 2013 on PCT/US2013/047494.
Office Action dated Feb. 2, 2016 in U.S. Appl. No. 14/884,607.

(Continued)

*Primary Examiner* — Quoc D Tran
(74) *Attorney, Agent, or Firm* — Brake Hughes Bellermann LLP

(57) ABSTRACT

Systems and methods for videoconferencing using an avatar are described. The presence of a user may be detected by analyzing video captured by a digital camera. The avatar may be provided to a remote device to represent the detected user.

18 Claims, 6 Drawing Sheets

(56) References Cited

U.S. PATENT DOCUMENTS

| | | | |
|---|---|---|---|
| 2002/0163572 A1 | 11/2002 | Center et al. | |
| 2004/0130614 A1* | 7/2004 | Valliath | H04N 7/147 348/14.01 |
| 2006/0031291 A1* | 2/2006 | Beckemeyer | G06Q 10/10 709/204 |
| 2006/0206560 A1 | 9/2006 | Kanada | |
| 2007/0186002 A1 | 8/2007 | Campbell et al. | |
| 2009/0309955 A1 | 12/2009 | Gladstone | |
| 2010/0128103 A1* | 5/2010 | Sim | H04N 7/147 348/14.02 |
| 2010/0315483 A1 | 12/2010 | King | |
| 2012/0086769 A1 | 4/2012 | Huber et al. | |
| 2012/0128146 A1* | 5/2012 | Boss | H04M 3/56 379/202.01 |
| 2012/0281059 A1* | 11/2012 | Chou | H04L 12/1827 348/14.07 |

OTHER PUBLICATIONS

Office Action dated Oct. 29, 2014 in U.S. Appl. No. 13/766,485.
Office Action dated Dec. 22, 2016 in U.S. Appl. No. 15/224,157.
Supplementary European Search Report dated Jun. 17, 2016 in European Patent Application No. 13826129.2.
YouTube, "CrazyTalk for Skype 2.0—Avatar Live!", pp. 1, available at: http://www.youtube.com/watch?v=MhWw0QuuYZI, last accessed Jun. 17, 2016.
Notice of Allowance dated Mar. 27, 2017 in U.S. Appl. No. 15/224,157.
Office Action dated May 26, 2017 in CN Patent Application No. 201380050279.8.
Partial European Search Report dated Mar. 1, 2016 in European Patent Application No. 13826129.2.
Notice of Allowance dated Apr. 27, 2015 in U.S. Appl. No. 14/884,507.
Notice of Allowance dated Jul. 15, 2015 in U.S. Appl. No. 13/765,455.

* cited by examiner

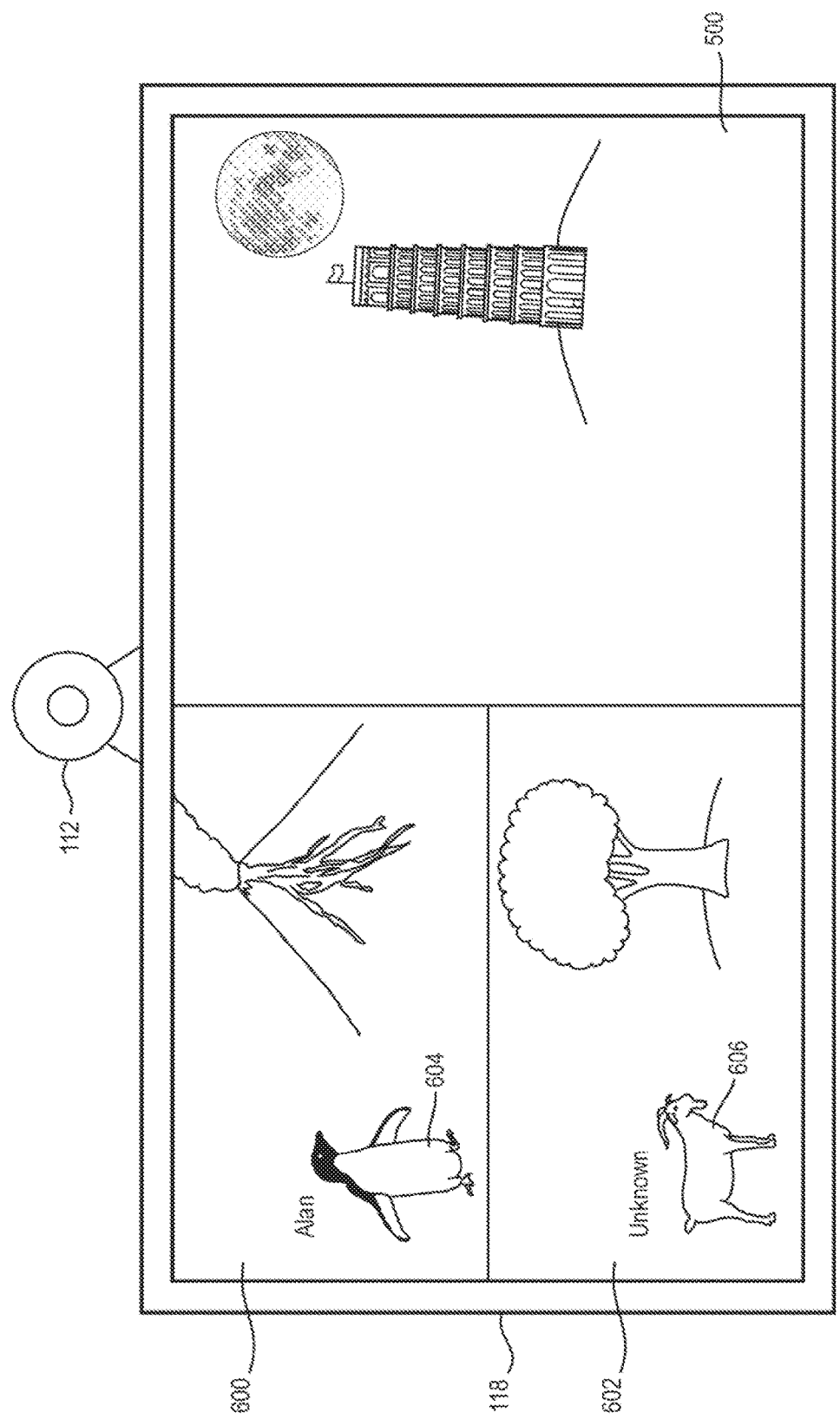

USING AN AVATAR IN A VIDEOCONFERENCING SYSTEM

CROSS-REFERENCE TO RELATED APPLICATIONS

This application is a continuation of U.S. patent application Ser. No. 15/224,157, filed Jul. 29, 2016, which is a continuation of U.S. patent application Ser. No. 14/884,607, filed Oct. 15, 2015, which is a continuation of U.S. patent application Ser. No. 13/766,485, filed Feb. 13, 2013, which claims the benefit of U.S. Provisional Application No. 61/678,535, filed Aug. 1, 2012, each of which is hereby incorporated by reference herein in its entirety.

BACKGROUND

The present disclosure relates generally to using an avatar in a videoconferencing system. The present disclosure more specifically relates to detecting the presence of a user in a video stream and representing the user as an avatar.

Videoconferencing generally involves combining a video stream with an audio stream, to allow users to see and hear one another. For example, a videoconference may be initiated between a user in Tokyo, Japan and a user in Rockford, Ill. Each user may operate a videoconferencing device that includes a camera, a microphone, a display and a speaker. Video captured via the camera at one device may be transmitted to the other device and presented on that device's display. Similarly, audio captured via the microphone at one device may be transmitted to the other device and played via that device's speaker. Such a system allows a user in one location to converse with the remote user as if the remote user were located in the same room.

SUMMARY

Implementations of the systems and methods for using an avatar in a videoconferencing system are described herein. One implementation is a method for initiating a videoconference. The method includes receiving, at a processing circuit, video data captured by a digital camera. The method also includes analyzing, by the processing circuit, the video data to detect the presence of a user. The method further includes providing display data to a remote device via a network interface, the display data being configured to cause the remote device to display an avatar on a display and being provided in response to the presence of the user being detected. The method additionally includes initiating the videoconference by providing the video data to the remote device.

Another implementation is a system for initiating a videoconference. The system includes a processing circuit operable to receive video data captured by a digital camera and analyze the video data to detect the presence of a user. The processing circuit is also operable to provide display data to a remote device via a network interface, the display data being configured to cause the remote device to display an avatar on a display and being provided in response to the presence of the user being detected. The processing circuit is further operable to initiate the videoconference by providing the video data to the remote device.

A further implementation is a system for initiating a communication session between first and second persons. The system includes a first processing circuit configured to receive video signals from a video camera monitoring an environment and to detect presence of the first person in the environment. The first processing circuit is also configured to transmit an indication of the presence of the first person in the environment. The system further includes a second processing circuit configured to receive the indication of the presence of the first person and to provide display data comprising an avatar representing the first person to a display device. The second processing circuit is also configured to receive a request from the second person to initiate a communication session with the first person and to initiate the communication session between the first and second persons.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims.

FIG. 6 is an example illustration of an electronic display in a videoconferencing system showing multiple windows.

DETAILED DESCRIPTION

According to some aspects of the present disclosure, an avatar may be used within a videoconferencing system to represent a user. The system may detect the presence of a user in a video and provide the avatar to a remote device, in response to the detection. For example, if a user's presence is detected in a video stream (e.g., the user walks into the living room), the user may be represented as an avatar on one or more other remote devices. Thus, the presence of the user may be conveyed to other users, prior to initiating a videoconference. If a remote user requests a videoconference, and the user represented by the avatar accepts, the videoconference may be initiated by sharing video and/or audio data between the two devices (e.g., the user's avatar is replaced with a video stream of the user on the remote device).

Figure 1:
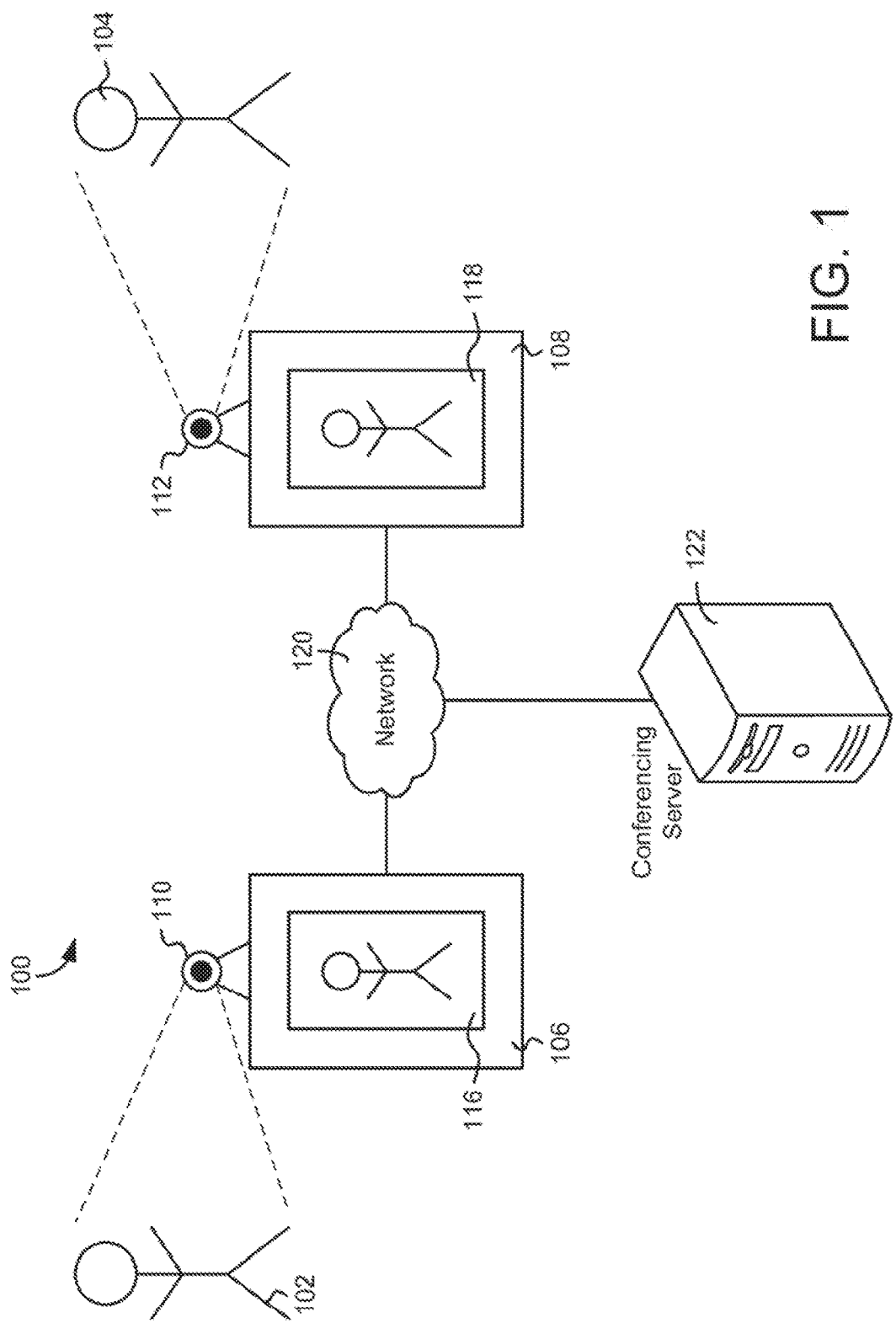
FIG. 1 is an illustration of an example computer system.

Referring to FIG. 1, an illustration of a computer system 100 is shown, according to various implementations. System 100 is generally configured to allow two or more users to initiate a videoconference. For example, user 102 may utilize system 100 to videoconference with user 104. System 100 may include any number of electronic devices to enable users 102, 104 to videoconference. As shown, user 102 may operate a videoconferencing device 106 and user 104 may operate a corresponding videoconferencing device 108. Devices 106, 108 may be in communication via a network 120 and configured to transmit video and/or audio between one another. In some implementations, system 100 may include a videoconferencing server 122 that coordinates the videoconferencing between devices 106, 108.

Network 120 may be any form of computer network that relays information between devices 106, 108, and server 122. For example, network 120 may include the Internet and/or other types of data networks, such as a local area network (LAN), a wide area network (WAN), a cellular network, satellite network, or other types of data networks. Network 120 may also include any number of computing devices (e.g., computer, servers, routers, network switches, etc.) that are configured to receive and/or transmit data within network 120. Network 120 may further include any number of hardwired and/or wireless connections. For example, device 106 may communicate wirelessly (e.g., via WiFi, cellular, radar, etc.) with a transceiver that is hardwired (e.g., via a fiber optic cable, a CAT5 cable, etc.) to other devices in network 120.

Videoconferencing devices 106, 108 may be any number of different user electronic devices configured to communicate via network 120 (e.g., laptop computers, desktop computers, tablet computers, smart phones, smart televisions, set-top boxes for televisions, video game consoles, etc.). In various implementations, devices 106, 108 include cameras 110, 112, respectively. Cameras 110, 112 may be integrated into devices 106, 108 or may be stand-alone cameras in communication with devices 106, 108 (e.g., via wired or wireless connections). For example, camera 110 may be a camera integrated into a laptop computer or may be a stand-alone camera connected to a smart television via a universal serial bus (USB) cable. During a videoconference, cameras 110, 112 capture video data for their respective surroundings. For example, camera 110 may capture video of the living room of user 102. If user 102 is present in the living room and within the purview of camera 110, the video data may also include images of user 102. The video data captured during a videoconference may then be communicated via network 120 to their respective devices (e.g., the video of user 102 may be communicated to device 108 during a videoconference).

Videoconferencing devices 106, 108 may also include displays 116, 118, respectively. During a videoconference, the video data captured by camera 110 may be displayed by display 118. Similarly, video data captured by camera 112 may be displayed by display 116. For example, user 102 may appear on display 118 during a videoconference, if user 102 is located in front of camera 110. In implementations in which the videoconference includes audio, one or both of devices 106, 108 may include microphones and speakers (not shown). Similar to the transfer of video between devices 106, 108, audio data from a microphone of one of the devices may be communicated to the other device. The audio may then be played by the receiving device via speakers. For example, user 102 may say "Hi, Bob," during the videoconference, which may be repeated by device 108 to user 104.

Server 122 may coordinate a videoconference between devices 106, 108 and any other videoconferencing devices in system 100. For example, server 122 may provide availability data to devices 106, 108 regarding the availability of the corresponding device for a videoconference. In some implementations, users 102, 104 may have user profiles on server 122. A user profile may include, for example, information about the user (e.g., the user's name, location, etc.). In some cases, a user profile may also include a list of other users with whom the user is socially connected (e.g., friends, relatives, co-workers, etc.). Such a list may be used by server 122 to provide availability data to devices 106, 108. For example, if user 104 is socially connected with user 102 via server 122, server 122 may provide device 108 with availability data regarding whether user 102 is available for a videoconference. If user 102 is available, user 104 may operate device 108 to request a videoconference with user 102. In such a case, server 122 may forward the request to device 106 and initiate the videoconference (e.g., by relaying video and/or audio data between devices 106, 108), if user 102 accepts the request.

In one implementation, users 102, 104 may operate devices 106, 108 to indicate their availability to participate in a videoconference. For example, user 102 may log into his user profile on server 122 and change his profile status to "Available." If user 104 is also logged into his user profile at the same time, user 104 may request a videoconference with user 102. However, this way of initiating a videoconference typically requires planning beforehand (e.g., users 102, 104 may agree beforehand to log on at a certain time). In addition, a user may not be available, even though his or her status indicates otherwise. For example, assume that user 102 changes his profile status to "Available" and then leaves the room to take a nap. In such a case, user 104 may attempt several times to initiate a videoconference with user 102 before giving up.

In other implementations, server 122 may be configured to receive video data from devices 106, 108 and detect the presence of users 102, 104, prior to a videoconference being initiated. For example, camera 110 may capture video of the living room of user 102 and send the video data to server 122. In response, server 122 may use image and/or facial recognition to detect the presence of user 102 in the video. In some implementations, user 102 may register his image with server 122 as part of his user profile. Server 122 may then compare the registered image with the video data to determine whether user 102 is present. In some cases, server 122 may also be configured to detect the presence of users that do not have user profiles. For example, assume that a friend of user 102 enters the room and does not have a user profile on server 122. In such a case, server 122 may still detect the presence of a human in the received video. Server 122 may provide an indication that a human has been detected to other corresponding videoconferencing devices. For example, an indication that user 102 is present in front of camera 110 may be sent by server 122 to device 108.

One potential indication of presence provided by server 122 may be in the form of an avatar. As used herein, an avatar refers to an image used to represent a human detected in a video stream. In some cases, the avatar may be an actual image of the user. For example, user 102 may upload a picture of himself to his user profile on server 122. When his presence is detected by server 122, the picture may be provided by server 122 to device 108, to notify user 104 that user 102 is available for a videoconference. In other cases, the avatar may be any other type of image (e.g., user 102 may be represented as an animal, a cartoon character, etc.). In cases in which the represented user is identified by server 122, the user's name or screen name may be provided in conjunction with the avatar. In some implementations, a background graphic may also be provided by server 122 to represent the surroundings of a user. An avatar may appear as a static image or may move across the background in relation to the represented surroundings. For example, the avatar may appear to walk across the background graphic, if its corresponding user walks across the room.

In one example, assume that users 102, 104 have not yet initiated a videoconference, but have left their respective devices 106, 108 active. Server 122 may represent the living room of user 102 as a forest scene on device 108. If user 102 enters the living room, server 122 may detect the presence of user 102 and update the forest scene to show a moose, the avatar of user 102. Thus, the presence of user 102 may be conveyed to user 104 without actually showing user 102 or his actual surroundings.

In some implementations, server 122 may be configured to interpret hands-free commands within a received video and/or audio stream. A hands-free command may be, for example, a voice command (e.g., a certain word or phrase uttered by a user) and/or a visual command (e.g., a particular hand gesture or body motion). For example, user 104 may wave to the avatar of user 102 to initiate a videoconference. In another example, user 104 may request a videoconference with user 102 by uttering the phrase, "Hi, Bob, want to chat?" Server 122 may interpret hands-free commands to perform any type of function associated with a videoconference. In non-limiting examples, server 122 may interpret hands-free commands to request a videoconference, accept a videoconference, change the volume of the audio (e.g., to increase, decrease, or mute the volume), enter an audio or video-only mode (e.g., only audio from device 106 is provided to device 108, only video from device 108 to device 106, etc.), end a videoconference, perform profile-related actions (e.g., changing an avatar), or cycle through background graphics representing scenes from different videoconferencing devices.

Some or all of the functions described with regard to server 122 may be integrated into devices 106, 108. For example, device 106 may itself be configured to interpret hands-free commands from user 102. In another example, a user's avatar and/or background may be stored by one of devices 106, 108 and provided to the other device. In some implementations, server 122 may not even be used to conduct a videoconference. For example, device 106 may directly communicate with device 108 over network 120, without server 122 coordinating the videoconference.

Figure 2:
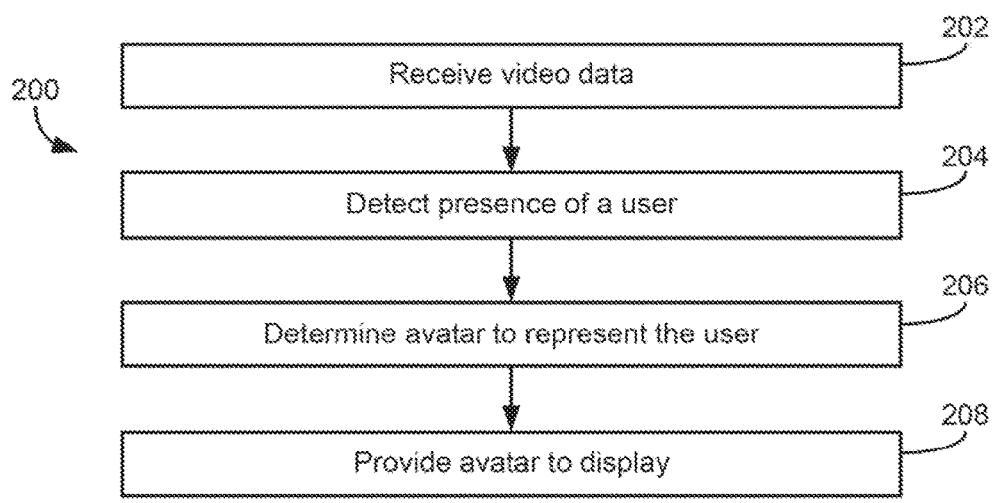
FIG. 2 is an illustrative flow diagram of a process for using an avatar in a videoconferencing system.

Referring now to FIG. 2, a illustrative flow diagram of a process 200 for using an avatar in a videoconferencing system is shown, according to one implementation. Process 200 may be implemented by any electronic device associated with a videoconference. For example, process 200 may be performed by an end-user videoconferencing device or a videoconferencing server that coordinates videoconferences between end-user devices. In various implementations, process 200 may be implemented as machine instructions that cause one or more processors of an electronic device to perform process 200. For example, a videoconferencing server may execute software stored in a memory to perform process 200.

Process 200 includes receiving video data (block 202). The video data may be a video stream or other form of video generated by one or more cameras for an end-user videoconferencing device. In some cases, the video data may be received directly from the one or more cameras. For example, the end-user videoconferencing device may receive the video data. In other cases, the video data may be received via a network. For example, a videoconferencing server may receive the video data from an end-user videoconferencing device via the network. In yet another example, the video data may be received by another end-user device (e.g., the video data from a first end-user device may be communicated to another end-user device).

Process 200 includes detecting the presence of a user in the video data (block 204). In various implementations, image and/or facial recognition may be used by the device that receives the video data to detect the presence of a user. The receiving device may analyze the video data to determine whether a human is present in the video and/or how many humans are present. For example, the receiving device may detect motion within the video or detect a human-like shape within the video. In some implementations, the receiving device may use facial recognition to determine the presence of a particular user within the video. For example, assume that the user registers his or her likeness with the device (e.g., by uploading an image of the user, by capturing the likeness of the user with a camera, etc.). In such a case, the device may use the registered likeness to specifically identify the user. In further implementations, non-human entities may also be identified. For example, the presence of a user's pet may be detected and treated in a similar manner as human users.

Process 200 includes determining an avatar to represent the detected user (block 206). A user having a user profile may specify a set of one or more avatars to represent the user to other users of the videoconferencing system. For example, the user may designate an image of a wolf as the user's avatar. If the user has been uniquely identified via image and/or facial recognition, the user may be represented by his avatar to other users of the videoconferencing system. In one implementation, the user may specify that a particular avatar is to be presented only to certain users. For example, a user may choose to be represented as a snake avatar to his friends, but as a bunny avatar to his fiancée. In other implementations, an avatar may be selected on behalf of the detected user. For example, the avatar may be selected randomly or based on an avatar already in use (e.g., a second user that enters the room may also be represented as a wolf, if a first user is currently being represented as a wolf). In this way, a user that is detected but cannot be identified (e.g., the user does not have a user profile, the user's face is obscured, etc.) may still be represented by an avatar to other users.

Process 200 includes providing the avatar to an electronic display (block 208). In some implementations, the avatar representing the detected user may be provided to a videoconferencing device for display. For example, the presence of a user at a first videoconferencing device may be represented on the display of a second videoconferencing device as the avatar. In some cases, the scenery surrounding the user in the video may also be represented as a background graphic. For example, a user's moose avatar may be presented as part of a woodland scene. The avatar may be static within the background graphic or may move about the scene (e.g., in proportion to the user moving in front of the camera, randomly, etc.). In some implementations, the avatar may react in response to a hands-free command from its corresponding user. For example, a user represented as a bird avatar may flap her arms to cause the bird avatar to fly within the background graphic.

Figure 3:
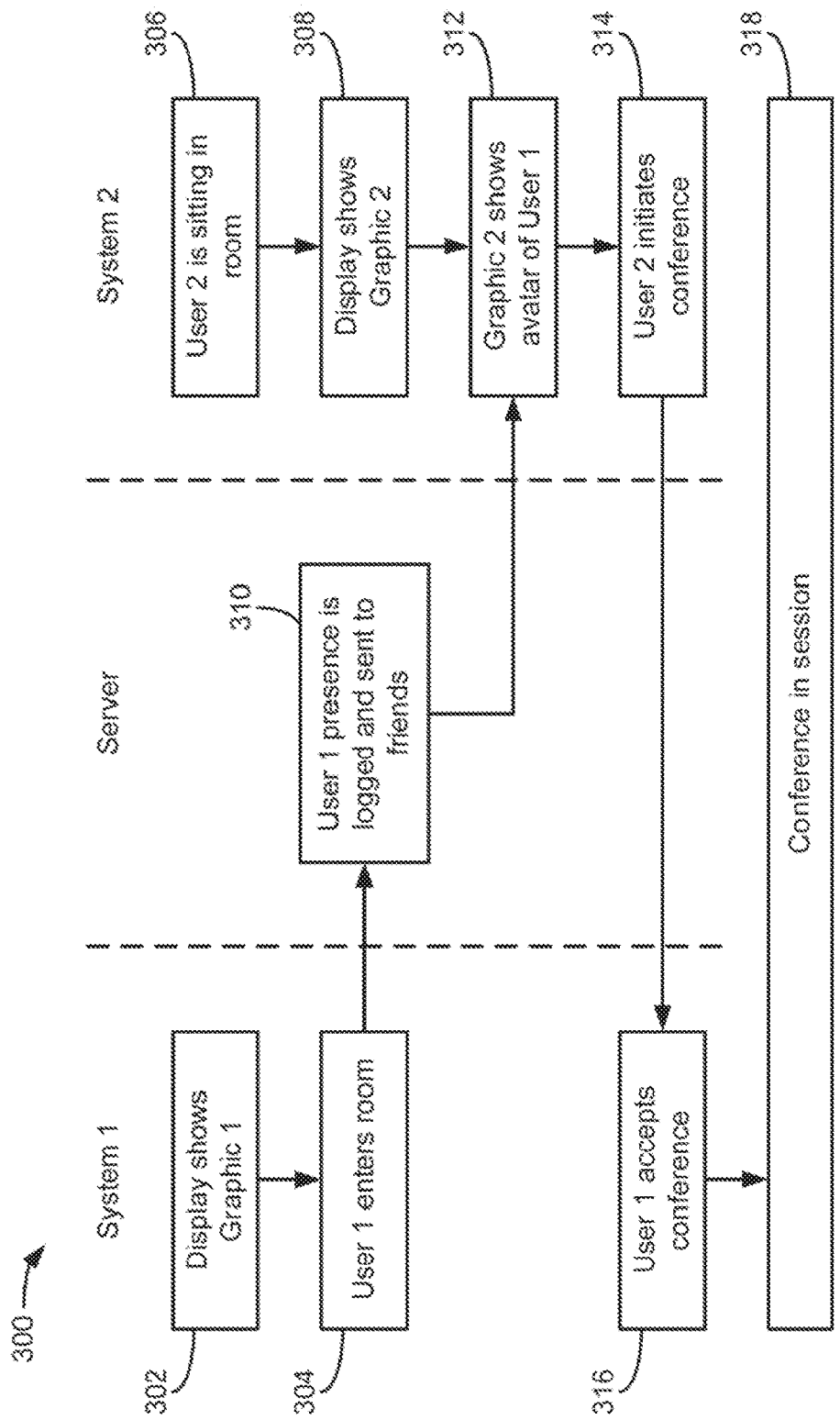
FIG. 3 is an illustration of a videoconference being initiated, according to various implementations.

Referring now to FIG. 3, an illustration 300 of a videoconference being initiated is shown, according to one implementation. As shown, a first videoconferencing device or system may communicate via a network with a second videoconferencing device or system. A videoconferencing server may coordinate and broker the initiation of the videoconference between the two end-user systems.

In the example shown, the first end-user system may display a first background graphic (block 302). For example, a painting of a field may be shown on the display, allowing the first end-user system to improve the ambiance of its surroundings (e.g., by displaying an aesthetically pleasing image instead of a chat application). In some implementations, the graphic may correspond to the scene captured by the second end-user system. For example, the painting of the field may represent a second user's bedroom. In another example, the painting of the field may represent a scene from a third videoconferencing system.

A user may be located in the same room as the second system (block 306). For example, the user may be sitting on a chair in front of a camera of the second system. The second system may display a second background graphic on the second end-user system, representing the scene captured by the first end-user system (block 308). For example, a painting of a dock may be displayed by the second system to represent the first user's living room. The second background graphic may be displayed in response to a request from the second user (e.g., the second user wishes to see whether the first user is available), may be displayed on a rotating basis (e.g., backgrounds representing the locations of the user's friends may be cycled periodically), or randomly.

In some implementations, the backgrounds displayed by the respective end-user devices may be provided by the videoconferencing server. For example, the server may analyze video data from one of the devices and provide a graphical representation of the captured scenery to the corresponding device. As shown, a first user may enter the room in front of the first system (block 304). The server may then detect the presence of the first user in the received video (block 310). In cases in which the first user has a user profile, the server may also identify the user and update the displays of the user's social connections. For example, assume that the first and second users are social connections (e.g., the second user is on the first user's contact list, the two users belong to the same social networking group, etc.). In such a case, the server may provide an indication of the presence of the first user to one or more other videoconferencing devices, to notify other users that the first user is available to videoconference.

The server may represent the detected first user as an avatar and cause the display of the second system to show the avatar (block 312). For example, the server may represent the first user as a bird avatar. In such a case, the dock scene being displayed at the second device may be updated by the server to show a bird landing on the dock. Thus, the second user may receive a notification that the first user is present in front of the first videoconferencing device, without actually displaying the first user.

The second user may initiate a videoconference by sending a request to the first user (block 314). In some implementations, the request may be sent in response to a hands-free command. For example, the second user may wave to the bird avatar and/or speak the name of the first user. The request may also be sent in response to the second user operating a keypad, touch screen display, pointing device, or similar user interface. In response to receiving the request, the first system may notify the first user that a videoconference is being requested. For example, the first system may shown an icon, generate a sound, or provide some other form of notification to the first user.

The first user may choose to accept the incoming request to videoconference (block 316). The acceptance may be made in a manner similar to the request command (e.g., via a hands-free command or by operating a user interface). For example, the first user may accept the request to videoconference by waving back to the first system.

A videoconference may be initiated, if the first user accepts the request (block 318). During a videoconference, the server may cause video and/or audio data captured by one end-user system to be relayed to the other end-user system. For example, the graphic shown on the second system may be replaced by streaming video captured by the first system. Similarly, streaming video captured by the second system may be provided to the display of the first system during the videoconference.

Figure 4:
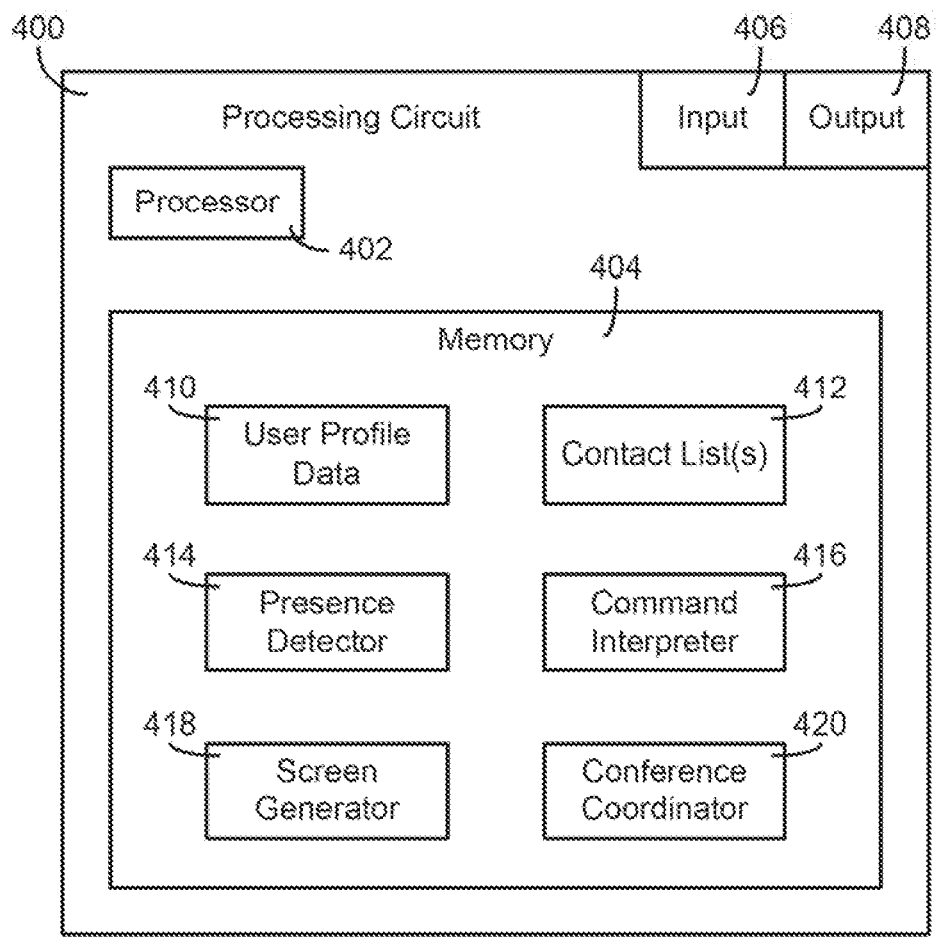
FIG. 4 is a schematic block diagram of a processing circuit configured to initiate a videoconference.

Referring to FIG. 4, a detailed block diagram of processing circuit 400 is shown, according to one implementation. Processing circuit 400 may be a component of a videoconferencing server (e.g., server 122 in FIG. 1 or another server) or another electronic device that coordinates a videoconference. Processing circuit 400 includes processor 402 and memory 404. Processor 402 may be or include one or more microprocessors, an application specific integrated circuit (ASIC), a circuit containing one or more processing components, a group of distributed processing components, circuitry for supporting a microprocessor, or other hardware configured for processing data. Processor 402 is also configured to execute computer code stored in memory 404 to complete and facilitate the activities described herein. Memory 404 can be any volatile or non-volatile computer-readable medium capable of storing data or computer code relating to the activities described herein. For example, memory 404 is shown to include presence detector 414, command interpreter 416, screen generator 418, and conference coordinator 420, which may be implemented using computer code (e.g., executable code, object code, source code, script code, machine code, etc.) configured for execution by processor 402. When executed by processor 402, processing circuit 400 is configured to complete the activities described herein. While the various data and software depicted in memory 404 are shown as part of a single processing circuit 400, any number of processing circuits may store and execute portions of the data and software. For example, command interpreter 416 may be stored and executed by a processing circuit in an end-user device or by processing circuit 400 as part of a videoconferencing server.

Processing circuit 400 also includes hardware circuitry for supporting the execution of the computer code presence detector 414, command interpreter 416, screen generator 418, and conference coordinator 420. For example, processing circuit 400 includes hardware interfaces (e.g., output 408) for providing video and/or audio data to other devices via a network (i.e., a network interface). Processing circuit 400 may also include an input 406 for receiving, for example, user profile data 410, streamed video and/or audio data, and one or more contact lists 412 from an end-user videoconferencing device. In various implementations, input 406 may be part of the same hardware interface as output 408 or may be a separate interface.

User profile data 410 may be received via input 406 from one or more user electronic devices and stored in memory 404. User profile data 410 may be utilized by processing circuit 400, for example, to identify a particular user across a plurality of user electronic devices. For example, user profile data 410 may include account data for a particular user that has a videoconferencing device. In some implementations, user profile data 410 may include one or more image and/or audio files from a particular user. For example, the user may upload an image of the user to processing circuit 400 for purposes of identifying the user in the future. In another example, an audio recording of the user speaking certain words or phrases may also be stored as part of user profile data 410.

User profile data 410 may include one or more avatars associated with a user profile. In various implementations, an avatar may be used to represent the user during times in which a video stream is not being shared between videoconferencing devices. The one or more avatars associated with a user profile may be uploaded by a user or may be selected from an existing set of avatars in user profile data 410. For example, a user may upload a custom image to represent the user. Similarly, user profile data 410 may include one or more background graphics to represent the scene captured by a camera of a user's videoconferencing device.

Contact lists 412 may be also be received via input 406 from one or more end-user devices and stored in memory 404. In general, a contact list relates a user profile to one or more other user profiles. In some implementations, a user profile may have multiple contact lists. For example, a user may create a first list for the user's friends, a second list for the user's coworkers, and a third list for the user's family. In some cases, a contact list may correspond to members of a social networking group. In some implementations, a user's avatar and/or background graphic may be assigned by the user to a contact. In other words, the user may designate that a particular avatar and/or background is to be used to represent the user to a specific contact or contact list.

Memory 404 may include presence detector 414, according to various implementations. Presence detector 414 is configured to analyze video data to detect the presence of one or more users in the video. Presence detector 414 may receive video data via input 406 from a videoconferencing device. For example, a user of a videoconferencing device may walk in front of a camera. Video data captured by the camera may then be received by processing circuit 400 and analyzed by presence detector 414. In some implementations, presence detector 414 may detect the presence of a user by detecting movement within the video. For example, the video may be of a user walking across the room and presence detector 414 may determine that a human-shape is moving within the video.

In some implementations, presence detector 414 may identify a user that is determined to be present within a video. Presence detector 414 may use facial recognition and/or image recognition to identify a particular user. For example, presence detector 414 may compare an uploaded image in user profile data 410 to the received video. If presence detector 414 determines that a match has been found, presence detector 414 may associate the video with the identified user. Thus, information within user profile data 410 may be associated with the detected user (the user's actual name, the user's screen name, etc.). In one implementation, presence detector 414 may analyze audio data captured by an end-user device to detect the presence of a user. For example, voice data associated with a user's profile may be matched to received audio data, to identify the user. If presence detector 414 utilizes voice analysis, it may do so in addition to, or in lieu of, analyzing the video data. For example, a user may be getting ready for a Halloween party and may be wearing a mask. Since the user's face is obscured, presence detector 414 may not be able to identify the user via facial recognition. However, presence detector 414 may match the user's voice in the received audio to stored audio data in user profile data 410, to identify the user. In some cases, presence detector 414 may be configured to detect the presence of a non-human entity, such as a user's pet.

Memory 404 may include command interpreter 416, which is configured to interpret commands received via input 406. Example commands include, but are not limited to, requests to initiate videoconferences, acceptances of such requests, commands to add, modify, or delete user profile data 410 and/or contact lists 412, commands to terminate videoconferences, and commands to change the presentation of audio and/or video to another device. In some implementations, command interpreter 416 may interpret a command received from a touch screen display, a keypad, a mouse, or other form of pointing device. In further implementations, command interpreter 416 may be configured to interpret a command within received video and/or audio. For example, command interpreter 416 may analyze video captured by a camera of a videoconferencing device to detect a user's gesture or motion. Such a gesture or motion may be interpreted by command interpreter 416 as being a request to perform a certain action. Similarly, a voice command within a received audio stream may be detected by command interpreter 416.

Memory 404 may include screen generator 418. In general, screen generator 418 is configured to generate display data to be provided to a videoconferencing device. For a user profile in user profile data 410, screen generator 418 may provide an associated background graphic to one or more contacts of the user. The background graphic may be provided by screen generator 418 to another videoconferencing device. In some cases, the background graphic may be provided to a second videoconferencing device based on whether a camera of a first device is active (e.g., based on whether video data is received from the first device via input 406). In other cases, the background graphic may be provided regardless of whether its corresponding videoconferencing device is active.

Screen generator 418 may receive an indication from presence detector 414 regarding the presence of one or more users and/or the identity of one or more users. In such cases, screen generator 418 may represent a detected user as an avatar. If the user has been identified, his or her avatar may be retrieved by screen generator 418 from user profile data 410. Screen generator 418 may also retrieve a screen name, actual name, or other type of identifier for the user, and provide it as part of a generated screen. For example, a user's name may appear on the screen with the avatar. If a user is detected but unidentified, screen generator 418 may still represent the user as an avatar, but also provide a label that the user could not be identified. In some implementations, screen generator 418 may be configured to analyze received video data and match a motion of a user to the user's corresponding avatar. For example, screen generator 418 may cause a user's avatar to walk across the background graphic, if the user walks across the room in front of the camera.

In some implementations, screen generator 418 may aggregate scenes from multiple videoconferencing devices into a single screen. For example, a screen generated by screen generator 418 may include two backgrounds to represent scenes from two different videoconferencing devices. In some cases, the number and selection of backgrounds displayed on a single screen may be determined by screen generator 418 via a command received from command interpreter 416. For example, a user may specify that she wishes to keep track of her friends, Beth and Becca, on the same screen. In other cases, screen generator 418 may randomly select which backgrounds are to be displayed. In some implementations, screen generator 418 may cycle through a user's contact list or a subset of the user's contacts periodically. For example, screen generator 418 may provide a background for a first contact and provide a background for a second contact after five minutes.

Memory 404 may include conference coordinator 420, in various implementations. In general, conference coordinator 420 is configured to initiate a videoconference between two or more end-user videoconferencing devices. For example, conference coordinator 420 may receive a request to initiate a videoconference from command interpreter 416 and an indication from screen generator 418 regarding which videoconferencing devices are to be included in the videoconference. Conference coordinator 420 may provide a request to any of the videoconferencing devices, which may then alert the other user or users to the request. If command interpreter 416 determines that one or more of the requested videoconferencing devices has accepted a request, conference coordinator 420 may initiate a videoconference by relaying video and/or audio streams between the requesting and accepting devices (e.g., by replacing a screen generated by screen generator 418 with a video stream). Similarly, conference coordinator 420 may receive a command from command interpreter 416 to terminate a videoconference. In such a case, conference coordinator 420 may stop relaying the video and/or audio streams and allow screen generator 418 to provide display data including avatars to the videoconferencing devices.

Figure 5:
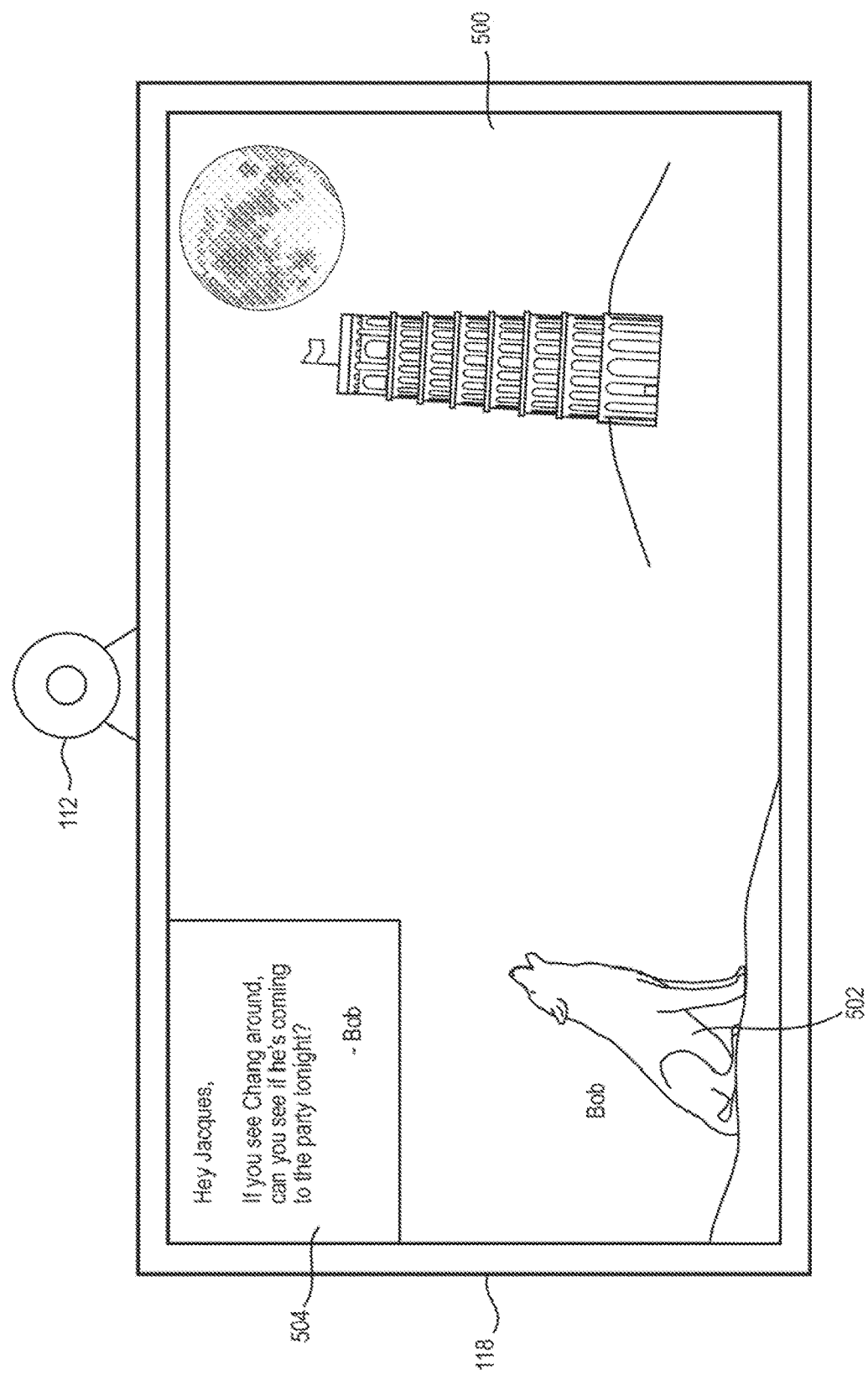
FIG. 5 is an example illustration of an electronic display in a videoconferencing system showing a background graphic and avatar.

FIG. 5 is an example illustration of electronic display 118 in FIG. 1 showing a background graphic 500 and an avatar 502, according to one implementation. As shown, background graphic 500 may be provided to videoconferencing device 108 by videoconferencing server 122 to represent the view of camera 110. For example, background graphic 500 may include a depiction of the Leaning Tower of Pisa. Background graphic 500 may be selected by videoconferencing server 122 randomly or based in part on a user profile for user 102. If user 102 is present in front of camera 110, videoconferencing server 122 may also provide avatar 502 with background graphic 500, to represent the detected presence of user 102. For example, assume that user 102 has specified that his name is "Bob" in a user profile on videoconferencing server 122 and that the user profile includes data regarding Bob's likeness (e.g., via an uploaded image, etc.). Videoconferencing server 122 may identify user 102 and label avatar 502 as representing Bob on display 118. In some implementations, avatar 502 may mimic the movement of user 102 on display 118. For example, avatar 502 may move across display 118 if user 102 walks across the room. In another example, avatar 502 may perform a certain action (e.g., howling at the Moon), if user 102 performs a certain motion or gesture.

Textual messages may be relayed by videoconferencing server 122 in conjunction with a background and/or avatar. For example, user 102 may operate a keypad of videoconferencing device 106 to ask user 104 whether Chan is going to attend a party (e.g., by typing message 504). Message 504 may then be provided by videoconferencing server 122 as part of the screen shown on display 118.

In some implementations, an audio stream may be sent between videoconferencing devices 106, 108, while background graphic 500 is being displayed. For example, user 104 may only be able to hear user 102, prior to initiation of a videoconference. A videoconference may also be unidirectional (e.g., user 102 is able to see user 104, but user 104 is represented as avatar 502 on display 118).

FIG. 6 is another example illustration of electronic display 118 showing multiple windows. In some implementations, videoconferencing server 122 may depict scenes from multiple videoconferencing devices within the same screen. For example, videoconferencing server 122 may provide a screen to videoconferencing device 108 that includes background graphics 500, 600, and 602. Background graphic 500 may represent videoconferencing device 106 and background graphics 600 and 602 may represent additional videoconferencing devices connected to videoconferencing server 122. Therefore, user 104 is able to review the availability of multiple users at the same time.

As shown, no avatar is displayed in conjunction with background graphic 500, indicating that user 102 is not available for a videoconference (e.g., user 102 is not in front of camera 110, camera 110 is turned off, etc.). Similarly, avatar 604 may be shown in conjunction with background graphic 600 to signify that the user "Alan" is available for a videoconference. In some implementations, a user's avatar may be provided on another user's background. For example, avatar 604 may be provided in conjunction with background graphic 500, if Alan is present in front of camera 110. Users that are unidentified by videoconferencing server 122 may also be represented. For example, avatar 606 may be provided in conjunction with background graphic 602, to signify that an unknown user is in front of the corresponding camera.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product embodied on a tangible medium or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A method for facilitating interactions between users, the method comprising:
  receiving camera data from a camera device associated with a computing device;
  determining, from the received camera data, movement information of a device user in an environment;

receiving a selection of an avatar that represents the device user in a communication session;

presenting, in the communication session, display data that includes the selected avatar that represents the device user and a user identifier that identifies the device user in which the user identifier is positioned in conjunction with the selected avatar and in which the display data corresponds to the movement information of the device user in relation to the environment; and modifying the display data that includes the avatar in response to receiving updated camera data from the camera device and determining updated movement information of the device user from the updated camera data.

2. The method of claim 1, wherein the camera device is integrated into the computing device.

3. The method of claim 1, wherein the camera device is in communication with the computing device.

4. The method of claim 1, further comprising generating a background graphic in which the avatar is presented.

5. The method of claim 1, further comprising receiving an indication from the device user to change the avatar to one of a plurality of avatars.

6. The method of claim 1, wherein retrieving the avatar further comprises accessing a profile associated with the device user, wherein the profile is associated with the avatar that was selected from a plurality of avatars and wherein the profile is associated with a username corresponding to the device user and wherein the username is presented along with the avatar in the display data.

7. The method of claim 1, further comprising detecting presence of the device user based on the movement information of the device user in the environment.

8. The method of claim 7, wherein the avatar is retrieved in response to detecting the presence of the device user in the environment.

9. The method of claim 1, further comprising initiating a communication session that presents the modified display data in which the avatar corresponding to the updated movement information of the device user in the environment is included.

10. The method of claim 9, wherein the communication session is a videoconference that is initiated between the computing device and another computing device, wherein the videoconference presents the display data that includes at least the presentation of the avatar to the another computing device.

11. The method of claim 10, further comprising:
detecting presence of the device user based on the movement information of the device user in the environment; and
generating an indication of the presence of the device user, wherein the indication notifies other device users that the device user is available for participating in the videoconference.

12. The method of claim 10, further comprising:
receiving audio data from the computing device;
determining that the audio data includes a voice input from the device user; and
presenting the voice input in the videoconference.

13. The method of claim 12, further comprising:
receiving video data from the computing device; and
in response to receiving the voice input from the device user, replacing the avatar with the received video data.

14. The method of claim 9, wherein retrieving the avatar further comprises:

identifying other device users participating in the communication session; and
selecting the avatar from a plurality of avatars based on the identified other device users in the communication session.

15. The method of claim 1, further comprising accessing a profile associated with the device user, wherein the profile indicates other device users with whom the user has a social connection.

16. The method of claim 15, further comprising:
detecting presence of the device user based on the movement information of the device user in the environment; and
generating an indication of the presence of the device user, wherein the indication notifies the social connection that the device user is available for participating in a communication session.

17. A system for facilitating interactions between users, the system comprising:
a memory; and
a hardware processor that, when executing computer executable instructions stored in the memory, is configured to:
receive camera data from a camera device associated with a computing device;
determine, from the received camera data, movement information of a device user in an environment;
receive a selection of an avatar that represents the device user in a communication session;
present, in the communication session, display data that includes the selected avatar that represents the device user and a user identifier that identifies the device user in which the user identifier is positioned in conjunction with the selected avatar and in which the display data corresponds to the movement information of the device user in relation to the environment; and
modify the display data that includes the avatar in response to receiving updated camera data from the camera device and determining updated movement information of the device user from the updated camera data.

18. A non-transitory computer-readable medium containing computer-executable instructions that, when executed by a processor, cause the processor to perform a method for facilitating interactions between users, the method comprising:
receiving camera data from a camera device associated with a computing device;
determining, from the received camera data, movement information of a device user in an environment;
receiving a selection of an avatar that represents the device user in a communication session;
presenting, in the communication session, display data that includes the selected avatar that represents the device user and a user identifier that identifies the device user in which the user identifier is positioned in conjunction with the selected avatar and in which the display data corresponds to the movement information of the device user in relation to the environment; and
modifying the display data that includes the avatar in response to receiving updated camera data from the camera device and determining updated movement information of the device user from the updated camera data.

* * * * *